(12) United States Patent
Agarwal

(10) Patent No.: US 11,715,471 B2
(45) Date of Patent: *Aug. 1, 2023

(54) SYSTEMS, METHODS, AND STORAGE MEDIA FOR PERFORMING ACTIONS BASED ON UTTERANCE OF A COMMAND

(71) Applicant: Suki AI, Inc., Redwood City, CA (US)

(72) Inventor: Sanket Agarwal, San Francisco, CA (US)

(73) Assignee: Suki AI, Inc., Redwood City, CA (US)

( * ) Notice: Subject to any disclaimer, the term of this patent is extended or adjusted under 35 U.S.C. 154(b) by 49 days.

This patent is subject to a terminal disclaimer.

(21) Appl. No.: 17/506,473

(22) Filed: Oct. 20, 2021

(65) Prior Publication Data

US 2022/0044681 A1 Feb. 10, 2022

Related U.S. Application Data

(63) Continuation of application No. 16/526,140, filed on Jul. 30, 2019, now Pat. No. 11,176,939.

(51) Int. Cl.
*G10L 21/00* (2013.01)
*G10L 15/30* (2013.01)
*G10L 15/22* (2006.01)
*G10L 15/08* (2006.01)

(52) U.S. Cl.
CPC ........... *G10L 15/22* (2013.01); *G10L 15/08* (2013.01); *G10L 2015/088* (2013.01); *G10L 2015/223* (2013.01)

(58) Field of Classification Search
CPC ..... G10L 15/22; G10L 15/30; G10L 2015/223; G10L 2015/088; G06F 3/167
See application file for complete search history.

(56) References Cited

U.S. PATENT DOCUMENTS

| 8,818,175 | B2 * | 8/2014 | Dubin | H04N 9/87 |
| | | | | 386/282 |
| 9,443,527 | B1 * | 9/2016 | Watanabe | G10L 15/30 |
| 9,711,148 | B1 * | 7/2017 | Sharifi | G10L 17/04 |
| 9,741,344 | B2 * | 8/2017 | Bakish | G10L 15/22 |
| 9,767,795 | B2 | 9/2017 | Konuma | |
| 10,152,966 | B1 * | 12/2018 | O'Malley | G10L 15/22 |
| 10,971,151 | B1 * | 4/2021 | Rajan | G06F 3/167 |

(Continued)

*Primary Examiner* — Seong-Ah A Shin
(74) *Attorney, Agent, or Firm* — Esplin & Associates, PC

(57) ABSTRACT

Systems and methods for recognizing and executing spoken commands using speech recognition. Exemplary implementations may: store actionable phrases; obtain audio information representing sound captured by a mobile client computing platform associated with a user; detect any spoken instances of a predetermined keyword present in the sound represented by the audio information; perform speech recognition on the sound represented by the audio information; identify an utterance of an individual actionable phrase in speech temporally adjacent to the spoken instance of the predetermined keyword that is present in the sound represented by the audio information; perform natural language processing to identify an individual command uttered temporally adjacent to the spoken instance of the predetermined keyword that is present in the sound represented by the audio information; and effectuate performance of instructions corresponding to the command.

10 Claims, 6 Drawing Sheets

(56) References Cited

U.S. PATENT DOCUMENTS

| | | |
|---|---|---|
| 2004/0193416 A1 | 9/2004 | Emonts |
| 2011/0112837 A1* | 5/2011 | Kurki-Suonio ......... G10L 15/22 |
| | | 704/235 |
| 2014/0214429 A1* | 7/2014 | Pantel .................... G10L 15/22 |
| | | 704/275 |
| 2016/0125883 A1* | 5/2016 | Koya ..................... G10L 15/22 |
| | | 704/232 |
| 2016/0379121 A1 | 12/2016 | Ge |
| 2017/0263248 A1* | 9/2017 | Gruber ................... G10L 15/02 |
| 2018/0040324 A1* | 2/2018 | Wilberding ............ G06F 3/167 |
| 2018/0108351 A1* | 4/2018 | Beckhardt .............. G10L 15/32 |
| 2018/0173494 A1* | 6/2018 | Choi ...................... G06N 20/00 |
| 2019/0114572 A1* | 4/2019 | Gold ............. G06Q 10/063114 |
| 2020/0066268 A1* | 2/2020 | Erell ...................... H04R 3/005 |

\* cited by examiner

Suki, the patient is a 30 year old woman presenting with 24 hours of epigastric abdominal pain... 604a Her past history is significant only for Gestational diabetes and a C-section 606a On exam, she appears... uncomfortable but in no acute distress... Her abdomen is tender in the right upper quadrant... 608a Labs show a normal white count of 8. LFTs are unremarkable, with total bilirubin of 1.1. 610a

New H&P Patient ← 600b

Ann Roberts  
Age 30 – Female

MRN: 999999999  
Date of Birth: 01/01/1989  
Date of Service: 02/19/2019

History of Present Illness ← 604b 30 year old woman presenting with 24 hours of epigastric abdominal pain. Onset of pain happened acutely about 30 minutes after dinner last night. The pain is constant and cramping in nature. She tried taking pepcid thinking it was reflux, and then tried advil, but neither of these helped. "No fevers or chills. She reports nausea but no vomiting."

Past Medical History ← 606b

Her past history is significant only for Gestational diabetes and a C-section.

Physical Exam
T 99.1 HR 83 BP 115/70 BMI 26.1

General: Uncomfortable, no acute distress ← 608b
Cardiac: Regular rate and rhythm
Respiratory: Clear to auscultation bilaterally
Abdomen: Tender in the right upper quadrant with a positive Murphy's sign. No generalized guarding or rebound tenderness. Well-healed Pfannenstiel incision.
Extremities: Warm, well-perfused

Studies ← 610b

Normal white count of 8. LFTs are unremarkable, with total bilirubin of 1.1.

Assessment and Plan

FIG. 6b

SYSTEMS, METHODS, AND STORAGE MEDIA FOR PERFORMING ACTIONS BASED ON UTTERANCE OF A COMMAND

FIELD OF THE DISCLOSURE

The present disclosure relates to recognizing and executing spoken commands using speech recognition.

BACKGROUND

Systems performing actions based on spoken commands are known (e.g., Siri, Alexa, Google, etc.). However, natural language processing may be performed on every instance of a spoken command which may be time consuming.

SUMMARY

The present disclosure may be related to recognizing and executing spoken commands using speech recognition. Upon detecting a predefined keyword in the sound represented by audio information capture by a mobile client computing device, a command may be identified. Electronic storage may store a set of predetermined actionable phrases. Individual ones of the predetermined actionable phrases may be correlated with individual commands. A user may utter one of the predetermined actionable phrases to initiate a command correlated with the predetermine actionable phrase uttered by the user. The user may utter a command in a more natural manner on which the system may perform natural language processing to identify the individual command to execute. This approach may allow performance of actions (i.e., command execution) to occur quicker upon the user utter one of the actionable phrases.

One aspect of the present disclosure relates to a system configured for recognizing and executing spoken commands using speech recognition. The system may include one or more hardware processors configured by machine-readable instructions. The electronic storage may be configured to store actionable phrases. Individual actionable phrases may be associated with individual commands. The commands may be used during medical documentation. The processor(s) may be configured to obtain audio information representing sound captured by a mobile client computing platform associated with a user. The processor(s) may be configured to detect any spoken instances of a predetermined keyword present in the sound represented by the audio information. The processor(s) may be configured to perform speech recognition on the sound represented by the audio information. The processor(s) may be configured to identify an utterance of an individual actionable phrase in speech temporally adjacent to the spoken instance of the predetermined keyword that is present in the sound represented by the audio information. Identification of the utterance of the individual actionable phrase may be responsive to detection of the spoken instance of the predetermined keyword present in the sound represented by the audio information. The processor(s) may be configured to perform natural language processing to identify an individual command uttered temporally adjacent to the spoken instance of the predetermined keyword that is present in the sounds represented by the audio information. Performance of natural language processing may be responsive to detection of the spoken instance of the predetermined keyword present in the sound represented by the audio information. The processor(s) may be configured to effectuate performance of instructions corresponding to the individual command.

Another aspect of the present disclosure relates to a method. The method may include storing actionable phrases. Individual actionable phrases may correlate to individual commands. The commands may be used during medical documentation. The method may include obtaining audio information representing sound captured by a mobile client computing platform associated with a user. The method may include detecting any spoken instances of a predetermined keyword present in the sound represented by the audio information. The method may include performing speech recognition on the sound represented by the audio information. The method may include identifying an utterance of an individual actionable phrase in speech temporally adjacent to the spoken instance of the predetermined keyword that is present in the sound represented by the audio information. Identification of the utterance of the individual actionable phrase may be responsive to detection of the spoken instance of the predetermined keyword present in the sound represented by the audio information. The method may include performing natural language processing to identify an individual command uttered temporally adjacent to the spoken instance of the predetermined keyword that is present in the sounds represented by the audio information. Performance of natural language processing may be responsive to detection of the spoken instance of the predetermined keyword present in the sound represented by the audio information. The method may include effectuating performance of instructions corresponding to the individual command.

Yet another aspect of the present disclosure relates to a non-transient computer-readable storage medium having instructions embodied thereon, the instructions being executable by one or more processors to perform a method. The method may include storing actionable phrases. Individual actionable phrases may correlate to individual commands. The commands may be used during medical documentation. The method may include obtaining audio information representing sound captured by a mobile client computing platform associated with a user. The method may include detecting any spoken instances of a predetermined keyword present in the sound represented by the audio information. The method may include performing speech recognition on the sound represented by the audio information. The method may include identifying an utterance of an individual actionable phrase in speech temporally adjacent to the spoken instance of the predetermined keyword that is present in the sound represented by the audio information. Identification of the utterance of the individual actionable phrase may be responsive to detection of the spoken instance of the predetermined keyword present in the sound represented by the audio information. The method may include performing natural language processing to identify an individual command uttered temporally adjacent to the spoken instance of the predetermined keyword that is present in the sounds represented by the audio information. Performance of natural language processing may be responsive to detection of the spoken instance of the predetermined keyword present in the sound represented by the audio information. The method may include effectuating performance of instructions corresponding to the command.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

FIG. 6b illustrates an example implementation of a system configured for recognizing and executing spoken commands using speech recognition, in accordance with one or more implementations.

DETAILED DESCRIPTION

Figure 1:
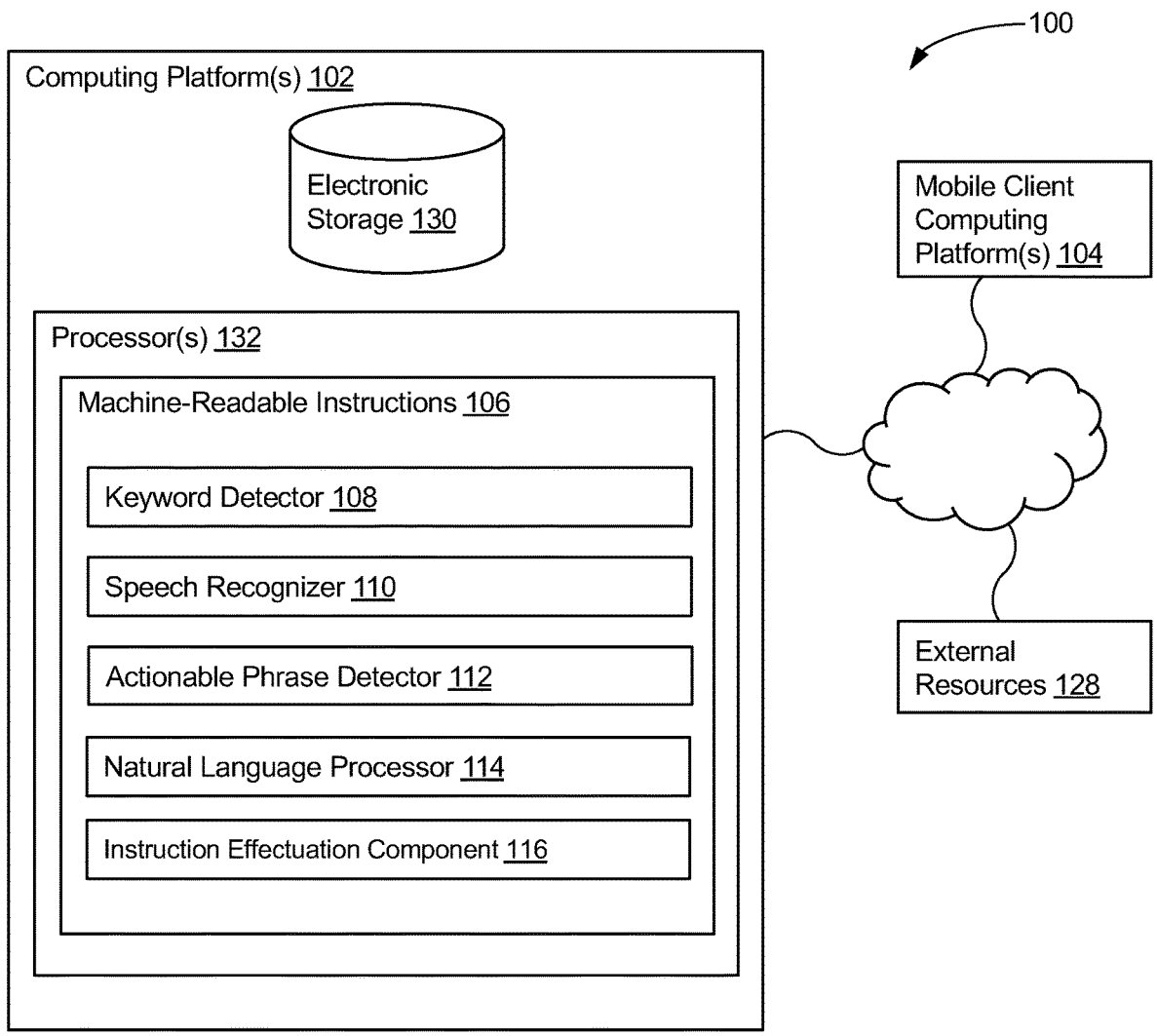
FIG. 1 illustrates a system configured for recognizing and executing spoken commands using speech recognition, in accordance with one or more implementations.

FIG. 1 illustrates a system 100 configured for recognizing and executing spoken commands using speech recognition, in accordance with one or more implementations. In some implementations, system 100 may include one or more servers 102. Server(s) 102 may be configured to communicate with one or more mobile client computing platforms 104 according to a client/server architecture and/or other architectures. Mobile client computing platform(s) 104 may be configured to communicate with other mobile client computing platforms via server(s) 102 and/or according to a peer-to-peer architecture and/or other architectures. Users may access system 100 via mobile client computing platform(s) 104.

Server(s) 102 may be configured by machine-readable instructions 106. Machine-readable instructions 106 may include one or more instruction components. The instruction components may include computer program components. The instruction components may include one or more of keyword detector 108, speech recognizer 110, actionable phrase detector 112, natural language processor 114, instruction effectuation component 116, and/or other instruction components.

Electronic storage 130 may be configured to store actionable phrases. Individual actionable phrases may correlate with individual commands. The commands may be used during medical documentation. By way of non-limiting example, the commands may include for taking a note, opening a file, reciting information, setting a calendar date, sending information, sending requests, and/or other commands. An actionable phrase may be predetermined. An individual actionable phrase correlating to an individual command may be altered, added, and/or deleted from electronic storage 130. The individual commands may correspond to instructions to perform individual actions.

Keyword detector 108 may be configured to obtain audio information representing sound captured by a mobile client computing platform associated with a user. Keyword detector 108 may be configured to detect any spoken instances of a predetermined keyword present in the sound represented by the audio information. The predetermined keyword may indicate that the user is uttering a command such that the utterance must be identified as an actionable phrase or natural language processing must be performed. The predetermined keyword may be fixed, interchangeable, and/or there may be more than one predetermined keyword. The predetermined keyword may be set or changed responsive to user selection.

Speech recognizer 110 may be configured to obtain audio information representing sound captured by a mobile client computing platform associated with a user. Speech recognizer 110 may be configured to perform speech recognition on the audio information representing sound captured by mobile client computing device 104. In some implementations, the recognized speech may facilitate keyword detector 108 detect any spoken instance of the predetermined keyword present in the sound represented by the audio information.

Actionable phrase detector 112 may be configured to identify an utterance of an individual actionable phrase in speech temporally adjacent to the spoken instance of the predetermined keyword that is present in the sound represented by the audio information. Identification of the utterance of the individual actionable phrase may be responsive to detection of the spoken instance of the predetermined keyword. The individual actionable phrase may correspond to an individual command such that corresponding instructions are to be performed. The recognized speech of speech recognizer 110 may facilitate actionable phrase detector 112 identify the utterance of the actionable phrase.

Natural language processor 114 may be configured to perform natural language processing. Performance of natural language processing may identify an individual command uttered temporally adjacent to the spoken instance of the predetermined keyword that is present in the sounds represented by the audio information. Identification of the individual command may be responsive to detection of the spoken instance of the predetermined keyword. Identification of the individual command may be responsive to not identifying the utterance of the individual actionable phrase in speech temporally adjacent to the spoken instance of the predetermined keyword that is present in the sound represented by the audio information. The individual command may be naturally uttered by a user in lieu of uttering an actionable phrase. The commands may include the individual command. Natural language processor 114 may identify an individual command of the commands based on the natural utterance by the user. By way of non-limiting example, "Suki save" may be an actionable phrase stored in electronic storage 130 and correlate with the command to save the latest version of documentation the user is editing. Spoken command "Suki please save the document" may be processed by natural language processor 114 to, similar to "Suki save", save the latest version of the documentation. In some implementations, the natural utterance by the user may not be associated to an individual command of the commands correlating with the actionable phrases stored in electronic storage 130. Natural language processor 114 may be configured to determine a command and/or instructions that correlate to the natural utterance by the user. Natural language processor 114 may be configured to identify, and store in electronic storage 130, frequently used words and/or phrases such that natural language processing performance becomes more accurate (e.g., with medical terms, frequently used phrases per user, etc.).

Instruction effectuation component 116 may be configured to effectuate performance of instructions corresponding to the command. In some implementations, instruction effectuation component 116 may be configured to transmit the instructions to the mobile client computing device to cause the mobile client computing device to execute the command. The instructions may correspond to the action to be performed.

Figure 4:
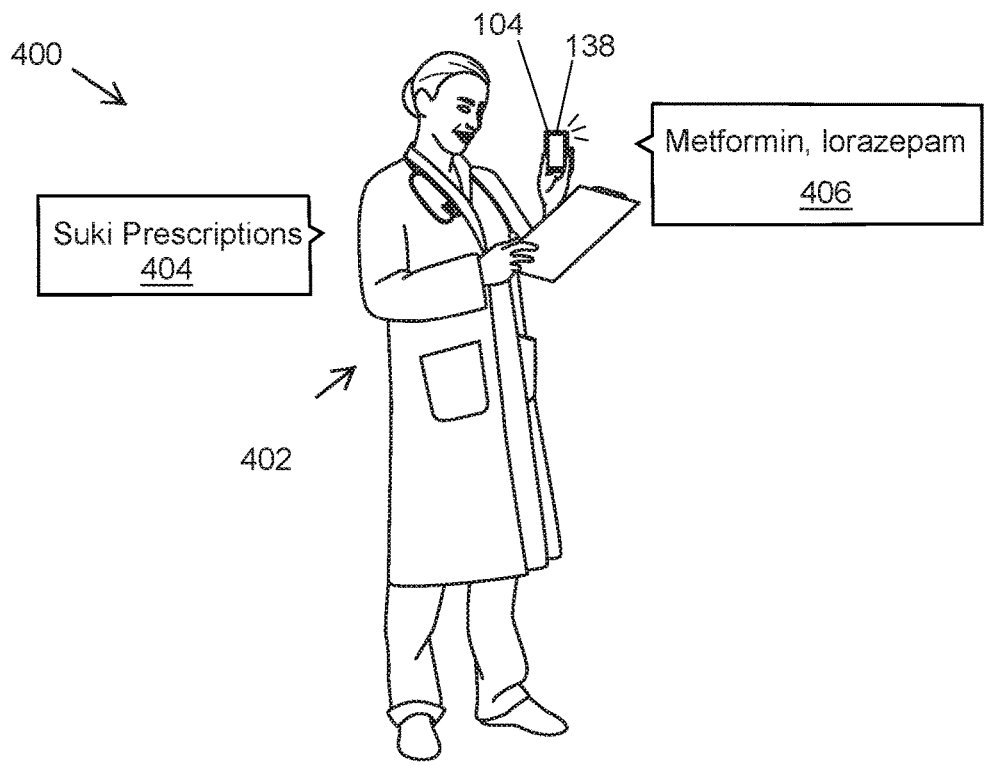
FIG. 4 illustrates an example implementation of a system configured for recognizing and executing spoken commands using speech recognition, in accordance with one or more implementations.

FIG. 4 illustrates an example implementation of a system configured for recognizing and executing spoken commands using speech recognition, in accordance with one or more implementations. FIG. 4 illustrates scenario 400 including doctor 402 and mobile client computing device 104. Doctor 404 may utter actionable phrase 404 causing mobile client computing device 104 to recite response 406 via speaker 122. Actionable phrase 404 may be a stored individual actionable phrase associated with an individual command. The individual command may cause mobile client computing device 104 to recite the prescriptions of a patient.

Figure 5:
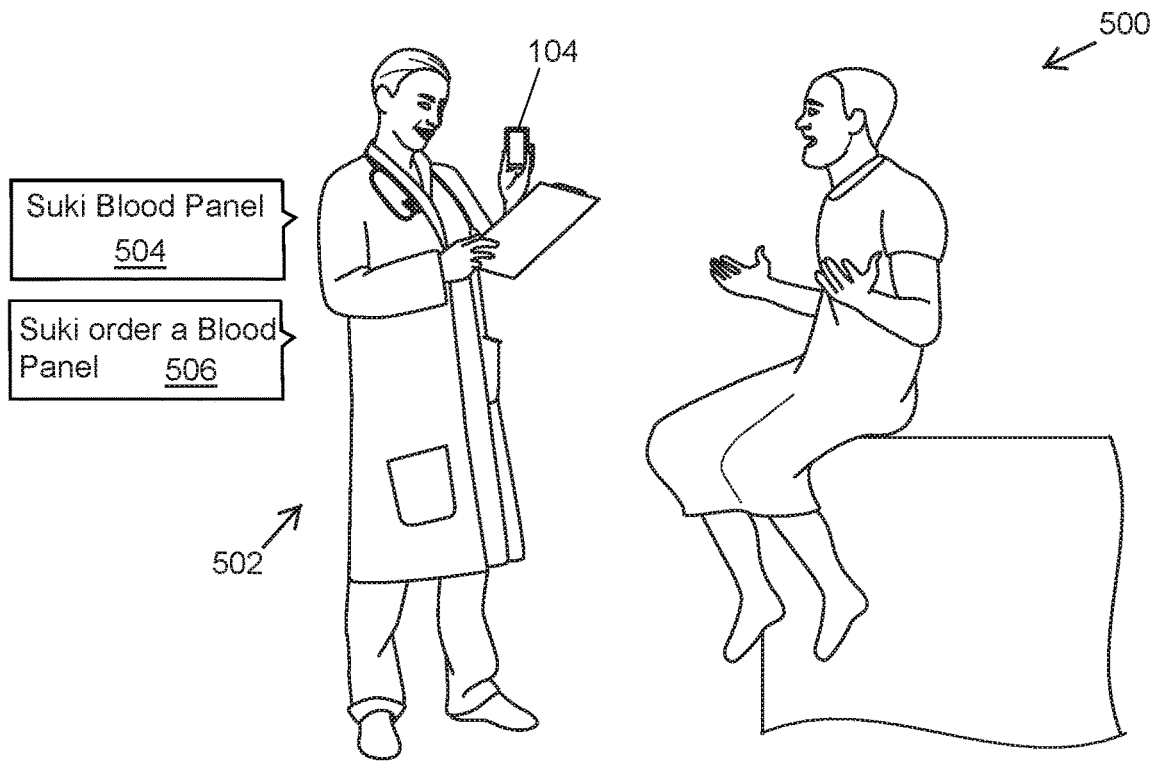
FIG. 5 illustrates an example implementation of a system configured for recognizing and executing spoken commands using speech recognition, in accordance with one or more implementations.

FIG. 5 illustrates an example implementation of a system configured for recognizing and executing spoken commands using speech recognition, in accordance with one or more implementations. FIG. 5 illustrates scenario 500 including user 502 and mobile client computing device 104. User 502 may state command 504. Command 504 may be spoken in a more natural manner. Command 504 may require natural language processing to identify the individual command and corresponding instructions to perform. A server (not illustrated) may perform the corresponding instructions. Alternative to command 504, user 502 may utter actionable phrase 506 for the same instructions to be performed.

Figure 6A:
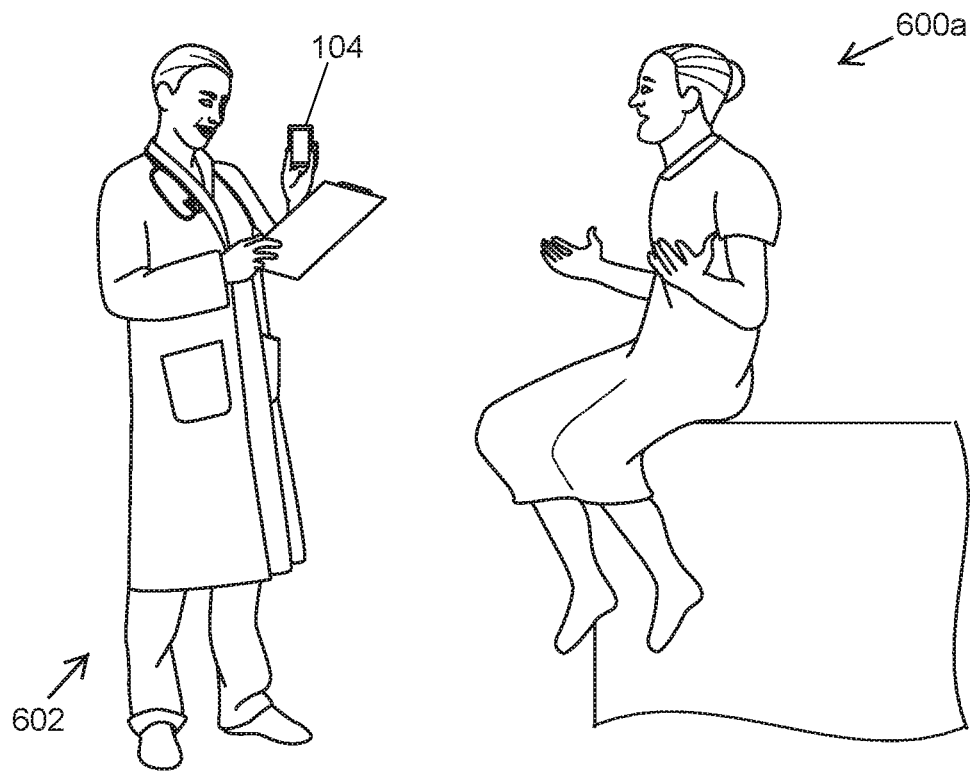
FIG. 6a illustrates an example implementation of a system configured for recognizing and executing spoken commands using speech recognition, in accordance with one or more implementations.

FIGS. 6a and 6b illustrate an example implementation of a system configured for recognizing and executing spoken commands using speech recognition, in accordance with one or more implementations. FIG. 6a illustrates scenario 600a including user 602 and mobile client computing device 104. User 602 may say statement 604a-610a in a more natural manner such that sections 604b-610b of a patient record 600b of FIG. 6b are filled out accordingly. Spoken phrases (e.g., "Her past history", "On Exam", "Labs", "abdomen", etc.) may indicate different sections and/or subsections (e.g., section 608b) to complete with the statements of user 602. The spoken phrases may be predetermined and stored in electronic storage 130, and/or identified by natural language processor 114. Statement 604a may be processed to complete section 604b. Statement 606a may be processed to complete section 606b. Statement 608a may be processed to complete section 608b. Statement 610a may be processed to complete section 610b. Processing may be performed by natural language processor 114.

Figure 2:
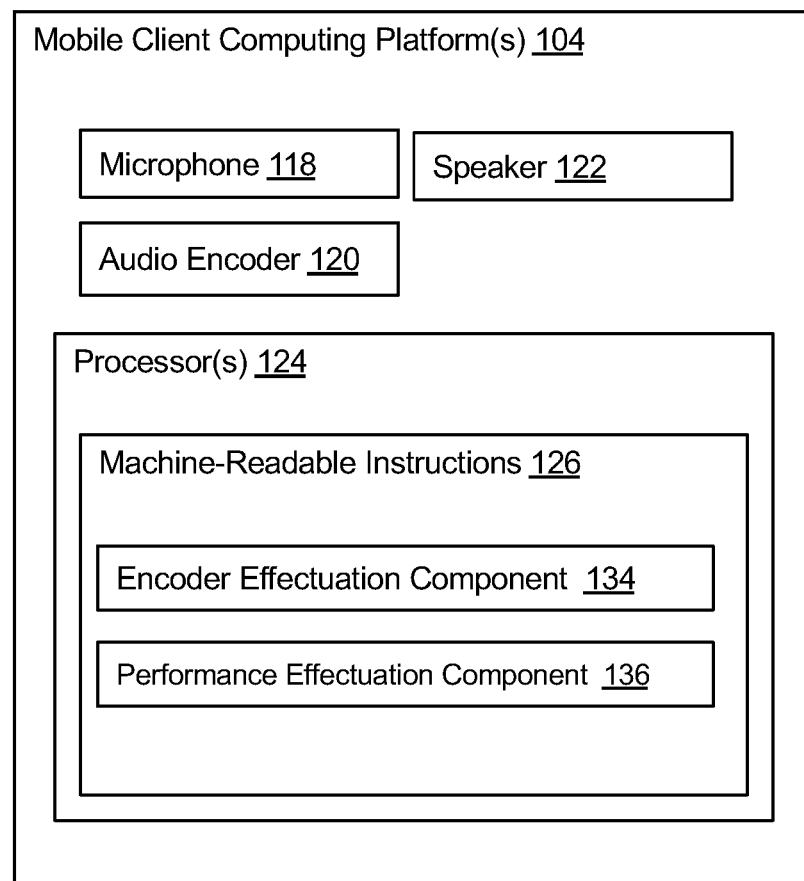
FIG. 2 illustrates a system configured for recognizing and executing spoken commands using speech recognition, in accordance with one or more implementations.

FIG. 2 illustrates a system configured recognizing and executing spoken commands using speech recognition, in accordance with one or more implementations. FIG. 2 illustrates mobile client computing platform 104. Mobile client computing device 104 may include one or more of microphone 118, audio encoder 120, speaker 122, and/or a processor 124. Mobile client computing platform 104 may be configured by machine-readable instructions 126. Machine-readable instructions 126 may include one or more instruction components. The instruction components may include computer program components. The instruction components may include one or more of encoder effectuation component 134, instruction effectuation component 136, and/or other instruction components.

Microphone 118 may be configured to convert the sound represented by the audio information to digital signals. Microphone 118 may include a single sound sensor or an array of sound sensors. The digital signals may include noise. Converting the sounds represented by the audio information may include converting analog waves to digital signals by precisely measuring the analog waves at consistent and frequent intervals. The digital signals may include noise that is unwanted. The sound sensor(s) may be configured to filter the digital signals of the noise. Microphone 118 may be configured to filter the digital signals of the noise.

Encoder effectuation component 134 may be configured to effectuate audio encoder 120. Audio encoder 120 may be configured to encode the digital signals to an audio file according to an audio file format such that the digital signals are compressed. By way of non-limiting example, the audio file format may include apple lossless audio, True Audio (TTA), Free Lossless Audio Code (FLAC), Moving Picture Experts Group Layer-3 (MP3), Advanced Audio Coding (AAC), Waveform Audio File Format (WAV), and/or other audio file formats. Encoder effectuation component 134 may be configured to effectuate audio encoder 120 always, never, for each session of use, when the audio information is determined to have more noise than signal in a signal-to-noise ratio (SNR), when configured to store the audio file, and/or other terms. A session of use may be a period of time in which system 100 may be used to perform actions in response to a determined spoken command of a user. By way of non-limiting example, sessions may include a patient visit, a meeting, a call, a day, a week, and/or other sessions. SNR may be defined as the ratio between signal and noise in which an audio file has more signal than noise with a high SNR.

Instruction effectuation component 136 may be configured to effectuate performance of instructions corresponding to the command. By way of non-limiting example, instructions for reciting information may be performed.

In some implementations, server(s) 102, mobile client computing platform(s) 104, and/or external resources 128 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, mobile client computing platform(s) 104, and/or external resources 128 may be operatively linked via some other communication media.

A given mobile client computing platform 104 may include one or more processors configured to execute computer program components. The computer program components may be configured to enable an expert or user associated with the given mobile client computing platform 104 to interface with system 100 and/or external resources 128, and/or provide other functionality attributed herein to mobile client computing platform(s) 104. By way of non-limiting example, the given mobile client computing platform 104 may include one or more of a desktop computer, a laptop computer, a handheld computer, a tablet computing platform, a NetBook, a Smartphone, a gaming console, and/or other computing platforms.

External resources 128 may include sources of information outside of system 100, external entities participating with system 100, and/or other resources. In some implementations, some or all of the functionality attributed herein to external resources 128 may be provided by resources included in system 100.

Server(s) 102 may include electronic storage 130, one or more processors 132, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from mobile client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, and/or 116, and/or other components. Processor(s) 132 may be configured to execute components 108, 110, 112, 114, and/or 116, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, and/or 116 are illustrated in FIG. 1 as being implemented within a single processing unit, in implementations in which processor(s) 132 includes multiple processing units, one or more of components 108, 110, 112, 114, and/or 116 may be implemented remotely from the other components. The description of the functionality provided by the different components 108, 110, 112, 114, and/or 116 described below is for illustrative purposes, and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, and/or 116. As another example, processor(s) 132 may be configured to execute one or more additional components that may perform some or all of the functionality attributed below to one of components 108, 110, 112, 114, and/or 116.

Processor(s) 124 may be configured to provide information processing capabilities in mobile client computing device(s) 104. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 2 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. Processor(s) 124 may be configured to execute components 134 and/or 136, and/or other components. Processor(s) 124 may be configured to execute components 134 and/or 136, and/or other components by software; hardware; firmware; some combination of software, hardware, and/or firmware; and/or other mechanisms for configuring processing capabilities on processor(s) 124.

It should be appreciated that although components 134 and/or 136 are illustrated in FIG. 2 as being implemented within a single processing unit, in implementations in which processor(s) 124 includes multiple processing units, one or more of components 134 and/or 136 may be implemented remotely from the other components. The description of the functionality provided by the different components 134 and/or 136 described below is for illustrative purposes, and is not intended to be limiting, as any of components 134 and/or 136 may provide more or less functionality than is described. For example, one or more of components 134 and/or 136 may be eliminated, and some or all of its functionality may be provided by other ones of components 134 and/or 136. As another example, processor(s) 124 may be configured to execute one or more additional components that may perform some or all of the functionality attributed below to one of components 134 and/or 136.

Figure 3:
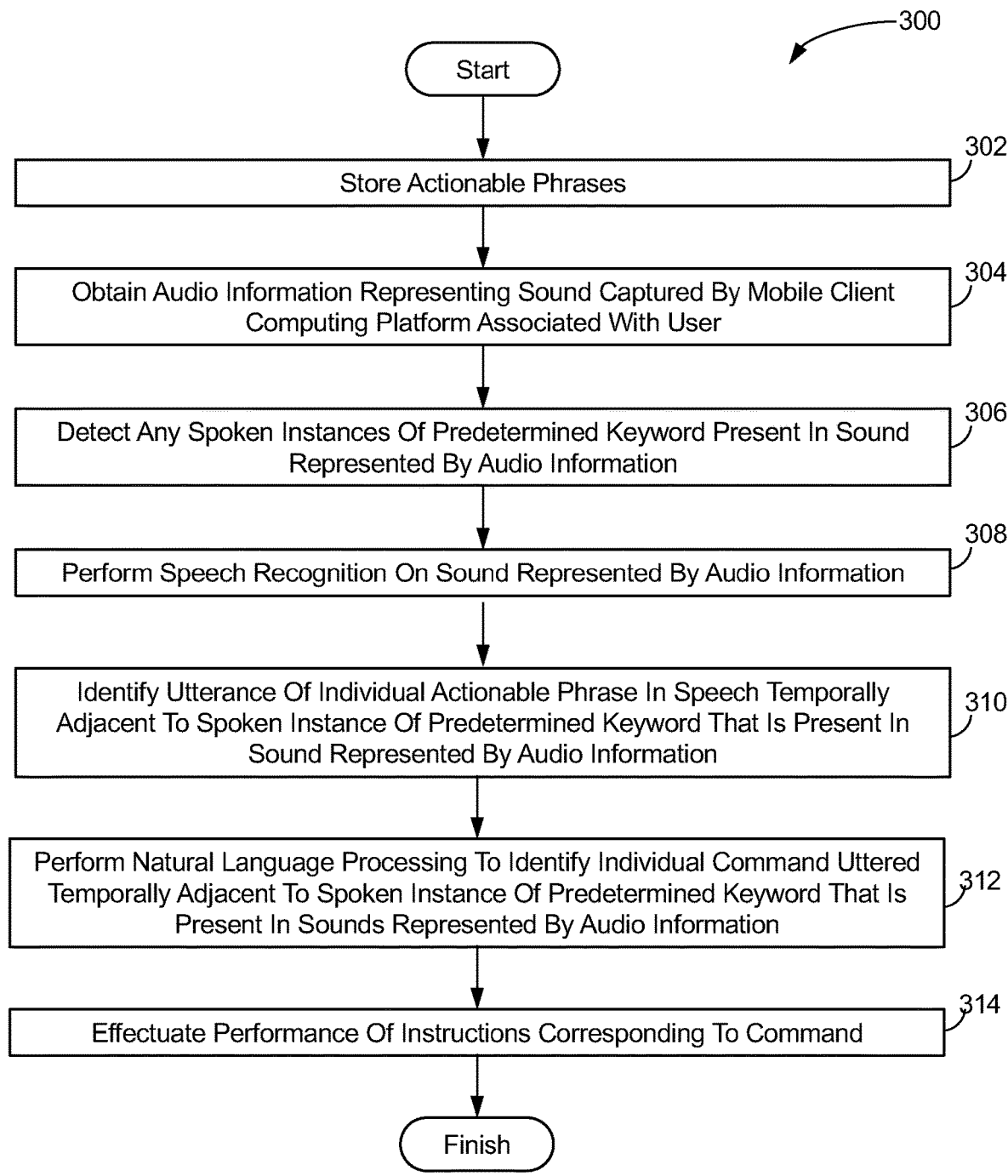
FIG. 3 illustrates a method for recognizing and executing spoken commands using speech recognition, in accordance with one or more implementations.

FIG. 3 illustrates a method 300 for recognizing and executing spoken commands using speech recognition, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

An operation 302 may include storing actionable phrases. Individual actionable phrases may correlate with individual commands. The commands may be used during medical documentation. Operation 302 may be performed by one or more hardware processors configured by machine-readable instructions including a component that is the same as or similar to electronic storage 130, in accordance with one or more implementations.

An operation 304 may include obtaining audio information representing sound captured by a mobile client computing platform associated with a user. Operation 304 may be performed by one or more hardware processors configured by machine-readable instructions including a component that is the same as or similar to speech recognizer 110 and/or keyword detector 108, in accordance with one or more implementations.

An operation 306 may include detecting any spoken instances of a predetermined keyword present in the sound represented by the audio information. Operation 306 may be performed by one or more hardware processors configured by machine-readable instructions including a component that is the same as or similar to keyword detector 108, in accordance with one or more implementations.

An operation 308 may include performing speech recognition on sounds represented by the audio information. Operation 308 may be performed by one or more hardware processors configured by machine-readable instructions including a component that is the same as or similar to speech recognizer 110, in accordance with one or more implementations.

An operation 310 may include identifying an utterance of an individual actionable phrase in speech temporally adjacent to the spoken instance of the predetermined keyword that is present in the sound represented by the audio information. Operation 310 may be performed by one or more hardware processors configured by machine-readable instructions including a component that is the same as or similar to actionable phrase detector 112, in accordance with one or more implementations.

An operation 312 may include performing natural language processing to identify an individual command uttered temporally adjacent to the spoken instance of the predetermined keyword that is present in the sounds represented by the audio information. Operation 312 may be performed by one or more hardware processors configured by machine-readable instructions including a component that is the same as or similar to natural language processor 114, in accordance with one or more implementations.

An operation 314 may include effectuating performance of instructions corresponding to the command. Operation 314 may be performed by one or more hardware processors configured by machine-readable instructions including a component that is the same as or similar to instruction effectuation component 116 and/or instruction effectuation component 136, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to recognize and execute spoken commands using speech recognition, the system comprising:
   electronic storage media configured to store actionable phrases, individual actionable phrases correlating to individual commands, wherein the commands are used during documentation;
   one or more processors configured by machine-readable instructions to:
     obtain audio information representing sound captured by a mobile client computing platform associated with a user;
     detect any spoken instances of a predetermined keyword present in the sound represented by the audio information;
     perform speech recognition on the sound represented by the audio information;
     responsive to detection of a spoken instance of the predetermined keyword present in the sound represented by the audio information, identify one or more utterances of actionable phrases in speech temporally adjacent to the spoken instance of the predetermined keyword that is present in the sound represented by the audio information;
     responsive to detection of the spoken instance of the predetermined keyword present in the sound represented by the audio information and responsive to not identifying the one or more utterances of the actionable phrases in speech temporally adjacent to the spoken instance of the predetermined keyword that is present in the sound represented by the audio information, perform natural language processing to identify individual commands uttered temporally adjacent to the spoken instance of the predetermined keyword that is present in the sounds represented by the audio information; and
     effectuate performance of instructions corresponding to the individual commands.

2. The system of claim 1, wherein the one or more processors are further configured by machine-readable instructions to:
   transmit the instructions to the mobile client computing device to cause the mobile client computing device to execute the individual commands.

3. The system of claim 1, wherein the mobile client computing device includes one or more of a microphone, an audio encoder, a speaker, and/or a processor.

4. The system of claim 3, wherein the one or more processors of the mobile client computing device are configured by machine-readable instructions to:
   convert the sound represented by the audio information to digital signals, wherein the digital signals include noise;

filter the digital signals of the noise; and effectuate the audio encoder to encode the digital signals to an audio file according to an audio file format.

5. The system of claim 1, wherein the commands include taking a note, opening a file, reciting information, setting a calendar date, sending information, and/or sending requests.

6. A method configured to recognize and execute spoken commands using speech recognition, the method comprising:

storing actionable phrases, individual actionable phrases correlating to individual commands, wherein the commands are used during documentation;

obtaining audio information representing sound captured by a mobile client computing platform associated with a user;

detecting any spoken instances of a predetermined keyword present in the sound represented by the audio information;

performing speech recognition on the sound represented by the audio information;

responsive to detection of a spoken instance of the predetermined keyword present in the sound represented by the audio information, identifying one or more utterances of actionable phrases in speech temporally adjacent to the spoken instance of the predetermined keyword that is present in the sound represented by the audio information;

responsive to detection of the spoken instance of the predetermined keyword present in the sound represented by the audio information and responsive to not identifying the one or more utterances of the actionable phrases in speech temporally adjacent to the spoken instance of the predetermined keyword that is present in the sound represented by the audio information, performing natural language processing to identify individual commands uttered temporally adjacent to the spoken instance of the predetermined keyword that is present in the sounds represented by the audio information; and effectuating performance of instructions corresponding to the individual commands.

7. The method of claim 6, further comprising:

transmitting the instructions to the mobile client computing device to cause the mobile client computing device to execute the individual commands.

8. The method of claim 6, wherein the mobile client computing device includes one or more of a microphone, an audio encoder, a speaker, and/or a processor.

9. The method of claim 8, further comprising:

converting the sound represented by the audio information to digital signals, wherein the digital signals include noise;

filtering the digital signals of the noise; and effectuating the audio encoder to encode the digital signals to an audio file according to an audio file format.

10. The method of claim 6, wherein the commands include taking a note, opening a file, reciting information, setting a calendar date, sending information, and/or sending requests.

* * * * *